United States Patent [19]
Grindle

[11] 3,882,620
[45] May 13, 1975

[54] APPARATUS AND METHOD FOR PRESENTATION OF READING MATERIALS

[76] Inventor: Paul D. Grindle, 2225 Mass. Ave., Cambridge, Mass. 02140

[22] Filed: May 2, 1973

[21] Appl. No.: 356,412

[52] U.S. Cl................................... 40/343; 40/31
[51] Int. Cl. ........................................... G09f 11/28
[58] Field of Search............ 40/31, 104 A, 341–343, 40/347, 348; 35/35 B

[56] References Cited
UNITED STATES PATENTS

| | | | |
|---|---|---|---|
| 2,803,900 | 8/1957 | Jones | 40/31 |
| 2,837,294 | 6/1958 | Jacobs | 40/31 X |
| 3,087,268 | 4/1963 | Rice | 40/104 A |
| 3,510,973 | 5/1970 | Mazzocco, Sr. | 40/31 X |

Primary Examiner—Robert W. Michell
Assistant Examiner—John H. Wolff
Attorney, Agent, or Firm—Pennie & Edmonds

[57] ABSTRACT

An apparatus specially adapted for use by handicapped persons, which presents reading material, such as books, magazines, newspapers, and the like to be read in the reflected light of normal room lighting or a reading lamp. The reading material is arranged on a continuous sheet which is rolled on a cylindrical spool. This feed spool is loaded into the apparatus and the sheet is attached to a take-up spool, both the feed and the take-up spools being drivable by a motor in the apparatus. The motor is electronically controlled so that the sheet of reading material may be automatically unwound or rewound, continuously, or page by page, past a viewing aperture in the apparatus. The electronic controls are operated by interchangeable sets of switches which are designed to accomodate the particular need of nearly any handicapped user.

5 Claims, 9 Drawing Figures

3,882,620

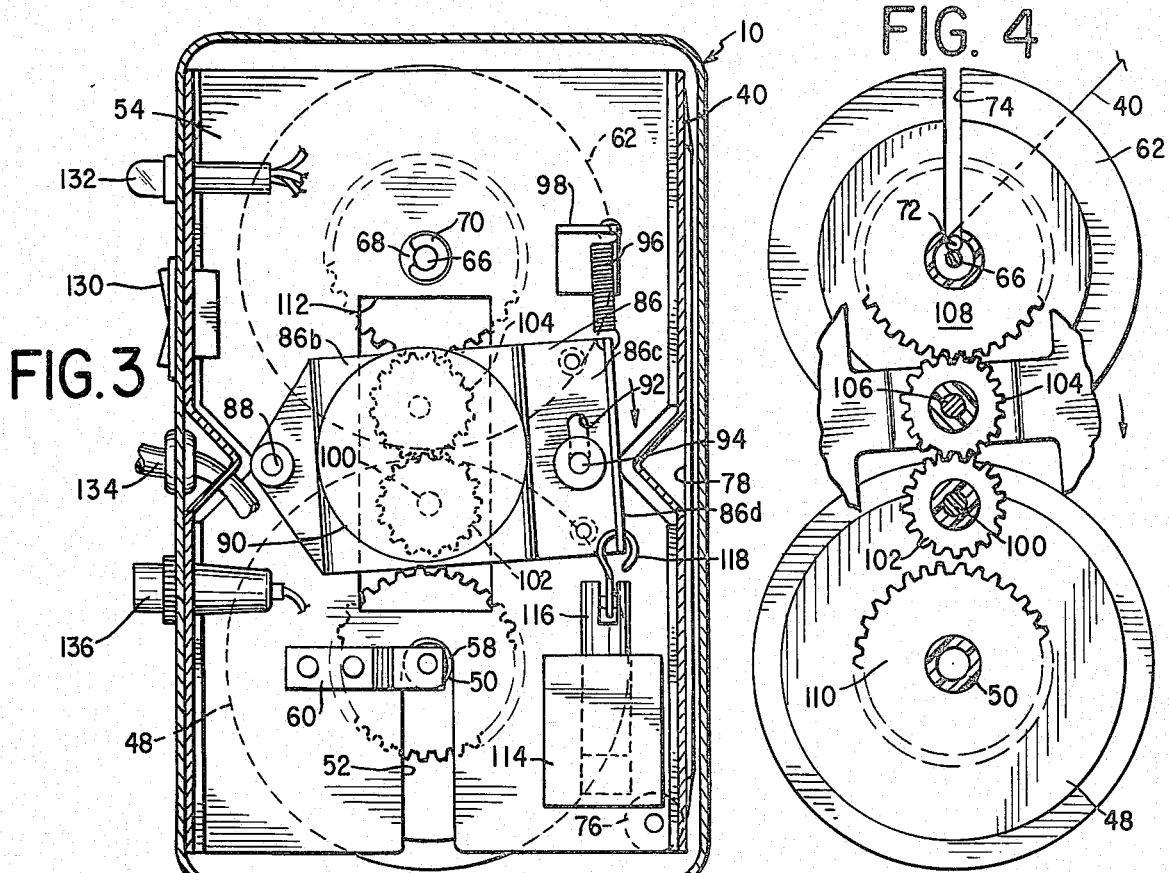
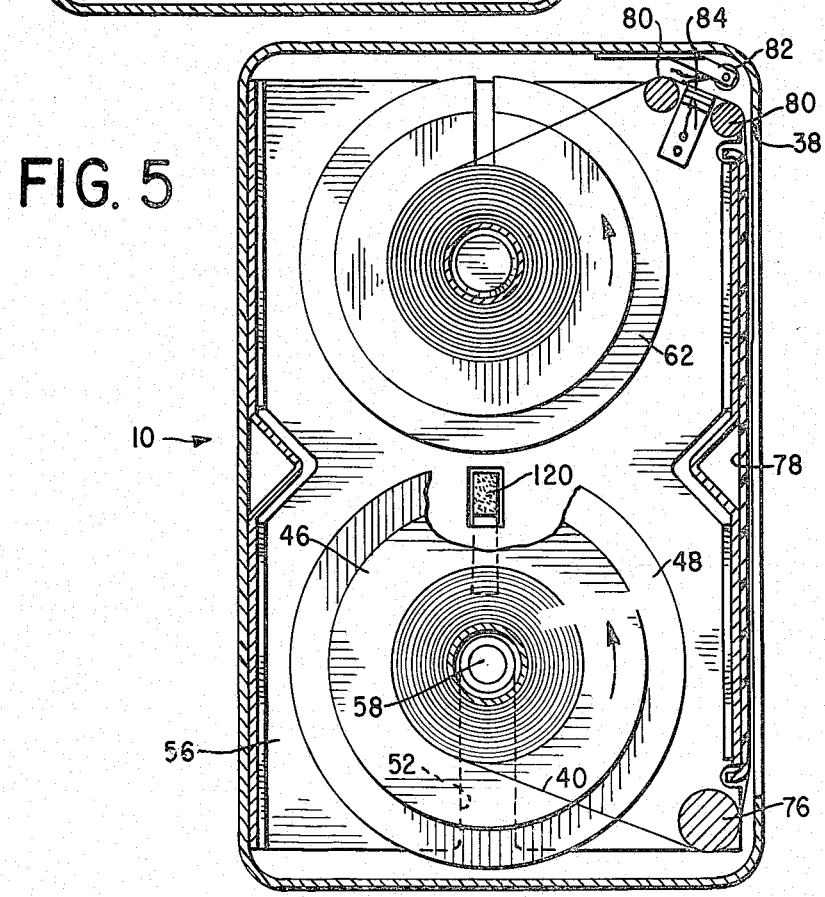

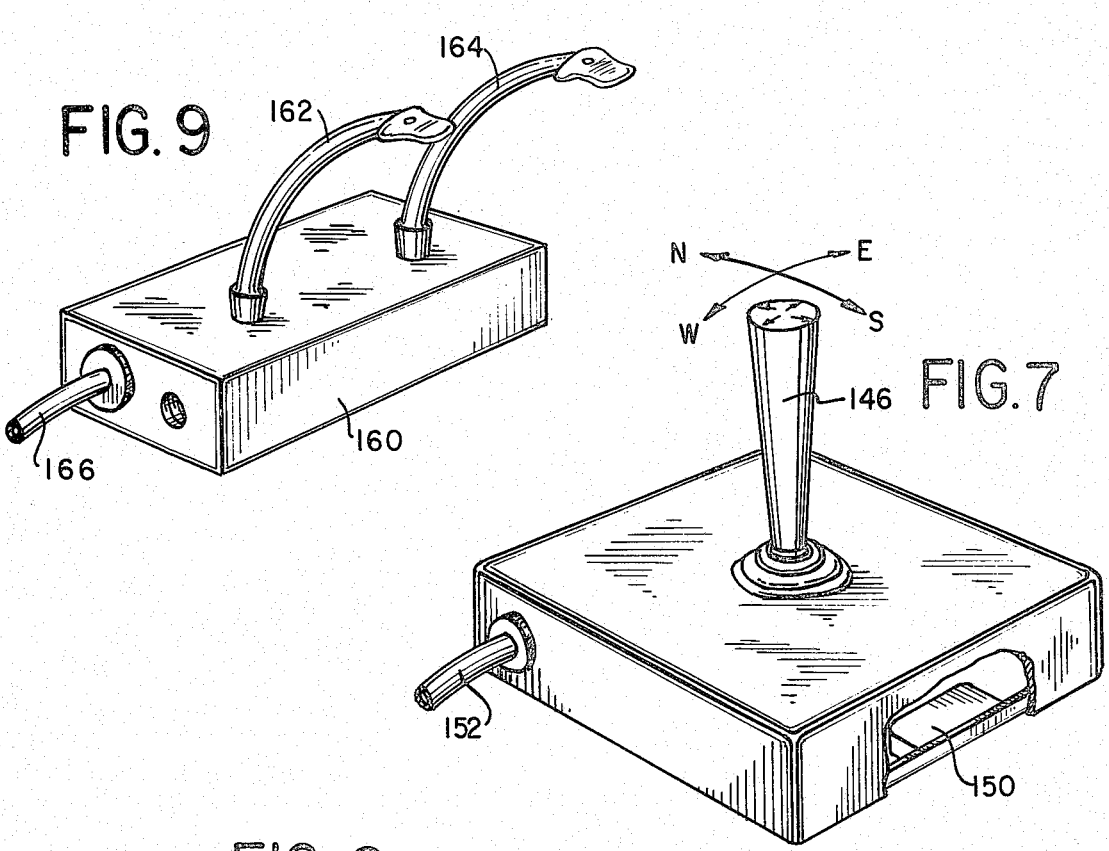
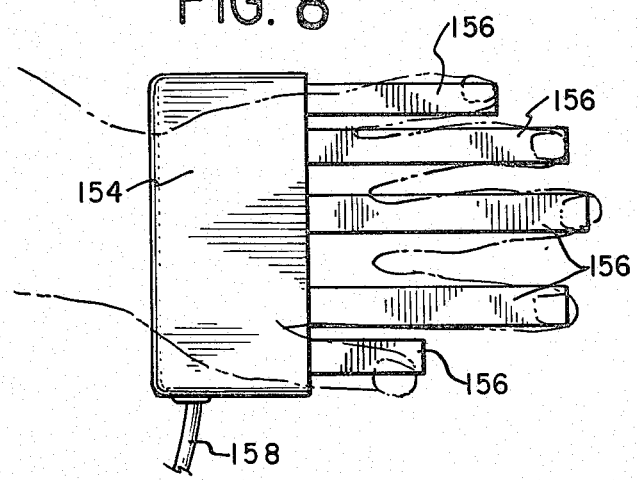

APPARATUS AND METHOD FOR PRESENTATION OF READING MATERIALS

BACKGROUND OF THE INVENTION

The present invention relates to devices used as reading aids. More particularly, the present invention relates to a device for presenting lengthy reading materials which may be conveniently used by handicapped persons.

There exists in the prior art a variety of reading devices, such as microfilm readers, television systems and teaching machines. Microfilm readers, television systems and related projected light or Cathode Ray Tube (CRT) scanning type devices have been found to be inadequate for the presentation of reading material because they are very tiring to the eyes. This is particularly true is such devices are used to present lengthy reading materials such as books, magazines, newspapers and the like. The present invention overcomes such difficulties by presenting the reading material in an easily read typeface on a good contrast background which can be read in reflected light in the same way that an ordinary book would be read.

Some teaching machines have been known which present reading material of limited length under ordinary lighting conditions. However, such devices are large, cumbersome machines which are not amenable to use by handicapped persons and are not known to have been used for presenting ordinary reading materials of any length such as books, newspapers, magazines and the like. The device of the present invention is a rugged, compact apparatus which is adaptable for use by even the most severely handicapped. In fact, the present invention can be used by a person who is incapable of any movement of his extremities. Heretofore, persons born with such severe handicaps were not even taught how to read because of the extreme frustration such a disability would cause in the absence of reading material which they could use with relative independence. The device of the present invention will make available to such persons a wide variety of reading material which they can read without the constant help of another person.

BRIEF SUMMARY OF THE INVENTION

The present invention utilizes a continuous sheet of at least 60 feet in length and upwards of many hundreds of feet upon which reading material is printed in a predetermined order, such as the successive pages of a full length book. The reading material is presented in a dark or black typeface (typically 12 point) upon a light or white background, similar to conventionally bound, multi-page books, magazines or the like. The reading material may also be printed in very large typeface, such as 18 point, as an aid to the visually handicapped. This sheet is wound on a feed spool and the spool is mounted within an enclosure having an aperture through which each portion of the sheet which corresponds to a page of the reading material may be moved for viewing by the reader through the aperture. As the sheet is unwound, it is rolled upon a take-up spool and the reader is provided with a remote control by which each page portion of the sheet may be moved into position for viewing through the aperture either page by page or continuously.

When displayed through the aperture, the continuous sheet and, more particularly, each page portion thereof is read by reflected lighting, that is, daylight illumination or light from a lamp as one ordinarily utilizes when reading a book, newspaper, or magazine. Such presentation enables the user to read lengthy reading material without fatigue of the eyes or any of the other objections which have been heretofore expressed when conventional devices have been attempted to be used for presentation of lengthy reading material, especially to handicapped persons.

BRIEF DESCRIPTION OF DRAWINGS

FIG. 3 is a section taken along line 3—3 of FIG. 2;

FIG. 4 is a section taken along line 4—4 of FIG. 2;

FIG. 5 is a section taken along line 5—5 of FIG. 2;

FIG. 7 is a perspective view of a gross motion control which may be used as a alternative to the control shown in FIG. 1;

FIG. 8 is a perspective view of a minimum movement control as an alternative to the control shown in FIG. 1, and FIG. 9 is a perspective view of a breath control as an alternative to the control shown in FIG. 1.

DETAILED DESCRIPTION OF THE INVENTION

Figure 1:
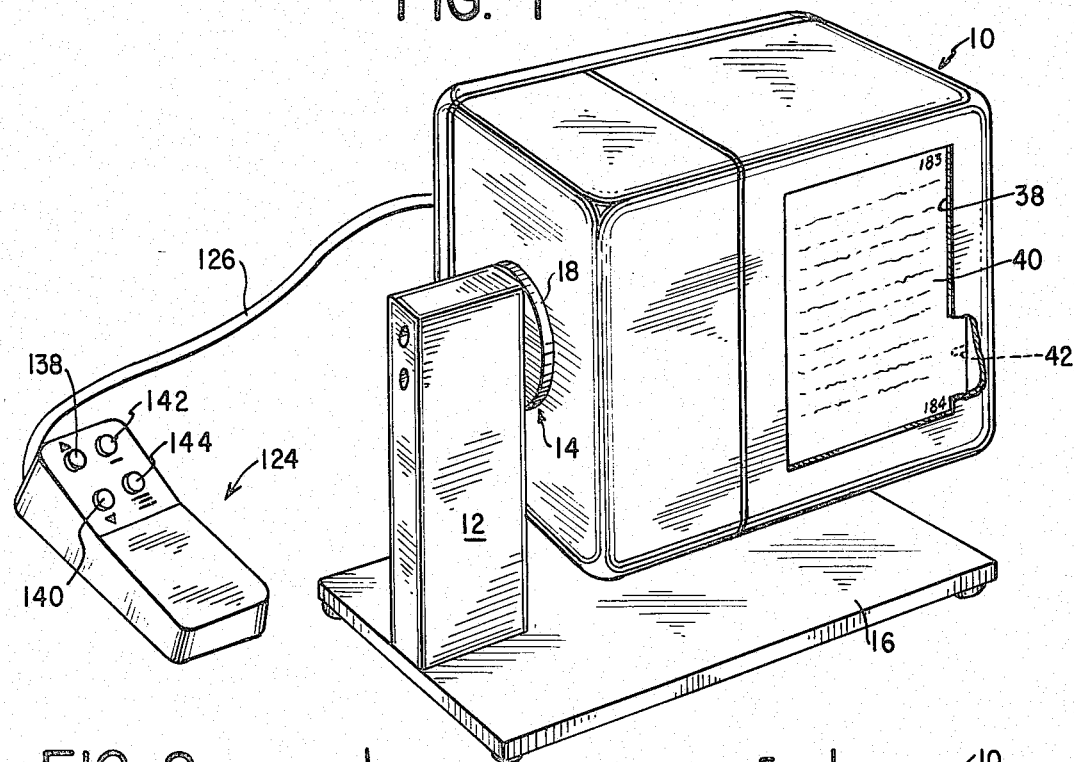
FIG. 1 is a perspective view of the apparatus of the invention including a remote control connected thereto.
Figure 2:
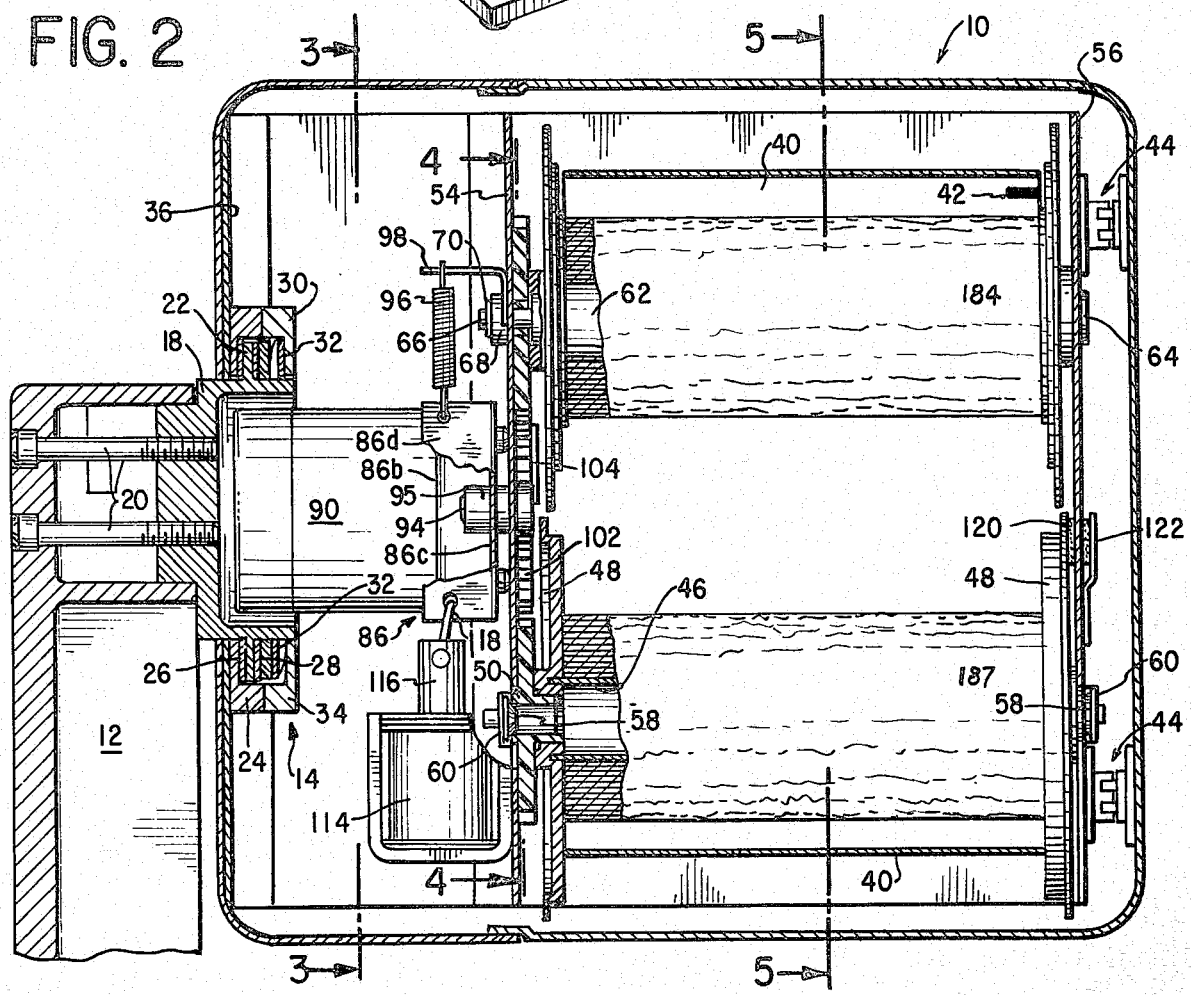
FIG. 2 is a front elevation with the front face of the apparatus removed and with parts partially in section for purposes of better illustration.

Referring to FIG. 1, the apparatus includes an enclosure 10 attached to a support arm 12 through an antigravity coupling 14, with the support arm 12 standing upon base 16. Referring to FIG. 2, coupling 14 includes a stationary cup 18 which is connected to arm 12 by bolts 20. The cup 18, is provided on its outer perimiter with an integral flange 22 which on the closed side of the cup fits within a recessed mounting member 24, with a thin gasket 26 of fibrous material being interposed between the flange and the bottom of the recess in member 24. A similar gasket 28 of fibrous material is fitted against the opposite side of flange 22 and a slip ring 30 bears against the gasket 28. A circular leaf spring is positioned adjacent the opposite side of slip ring 30 and a complimentary recessed mounting member 34 is secured by bolts (not shown) to the member 24, thereby compressing the spring 32 against slip ring 30 which in turn presses against the sandwich of gaskets 26 and 28 and flange 22. Recessed mounting member 24 is attached by bolts (not shown) to the inner side panel 36 of enclosure 10. This construction enables enclosure 10 to be rotated about an axis extending horizontally through the center of the cup member 18, since the recessed mounting members 24 and 34 can be rotated about the stationary flange 22 of the cup 18. The spring 32 and slip ring 30 hold the enclosure at any angle to which it is rotated, so that the reader may adjust the enclosure to a suitable position for reading.

Referring again to FIG. 1, the front of enclosure 10 has an aperture 38 through which reading material printed on a continuous sheet 40 may be read. The continuous sheet 40 contains, for example, the pages of an entire book running to a length of several hundred pages. Also printed upon the sheet 40 are index marks 42 which are positioned in the margin and between successive page portions of the reading material and thus provide and indication of the beginning and end of each page.

Referring again to FIG. 2, the portion of the enclosure 10 which includes aperture 38 may be pivoted open on hinges 44. When so opened, a feed spool 46 upon which sheet 40 has been rolled may be mounted within the enclosure for rotation and unwinding of the sheet. The feed spool 46 has end flanges 48 and outwardly projecting central bosses 50. The bosses 50 are slid into parallel slots 52 (shown in FIGS. 3 and 5) cut into the inner support panels 54 and 56, and concave depressions in the outer surfaces of bosses 50 engage with convex locking buttons 58 which are spring loaded through spring levers 60 attached to the support panels 54 and 56. Thus, feed spool 46 is both detachably and rotatably supported between the support panels 54 and 56 of enclosure 10, and may be readily emplaced and removed from this position by simply pushing and pulling bosses 50 into and out of engagement with the locking buttons 58 via slots 52.

A take-up spool 62 is rotatably mounted between support panels 54 and 56 by means of a cylindrical boss 64, which projects through panel 56, and a shaft 66 which projects through bearing 68 in panel 54, the shaft being secured in the bearing with a retaining C-washer 70.

Referring now to FIG. 4, the leading edge of sheet 40 is provided with a holding rod 72 which may be dropped into slots 74 in take-up spool 62, thereby attaching the sheet for unwinding from feed spool 46 onto take-up spool 62. Referring to FIG. 5, the sheet passes over the bottom guide roller 76, flat bed plate 78 and upper guide rollers 80 and thus is presented for reading through aperture 38.

In passing over rollers 80, the sheet is guided in a substantially flat plane at an angle to its position at aperture 38 to facilitate its passage between a light source 82 and a light detector 84. The light source 82 illuminates the path of the index marks 42 positioned between the pages of the reading material and each time an index mark blocks the light from passing to detector 84, a signal is generated which is utilized in operation of the controls to be explained more fully hereinbelow.

Referring to FIGS. 2 and 3, a pivot plate 86 is pivotably attached to support panel 54 at point 88. The triangular portion 86a of pivot plate 86 extends from point 88 parallel to support panel 54 and leads to an outwardly stepped portion 86b on which is mounted an electric motor 90. From the outwardly stepped portion 86b, pivot plate 86 steps inwardly back to portion 86c which also is parallel to support panel 54. Portion 86c steps outwardly again to form portion 86d at a right angle to portion 86c.

Portion 86c of pivot plate 86 is provided with a slot 92 into which guide stud 94, attached to support panel 54, projects. The stud 94 is provided with a lock nut 95, which maintains pivot plate 86 in slidable relation to support panel 54. Pivot plate 86 is biased into a normally up position by coil spring 96 attached to portion 86d and to an anchoring bracket 98 which, in turn, is secured to support panel 54.

The drive shaft 100 of motor 90 extends through portion 86b of pivot plate 86 and has a drive gear 102 attached thereto. Drive gear 102 is in constant mesh with idler gear 104 which is mounted upon the idler shaft 106, the shaft being rotatably attached to portion 86b of pivot plate 86.

Both the feed spool 46 and the take-up spool 62 are equipped with gears 110 and 108, respectively, which are partially exposed through aperture 112 in support panel 54 for availability to and cooperation with the drive gear 102 and idler gear 104. In the normally upper biased position of pivot plate 86, idler gear 104 is in mesh with gear 108 of take-up spool 62. Therefore, upon activation of motor 90, drive gear 102 rotates counterclockwise, idler gear 104 rotates clockwise and gear 108 together with take-up spool 62 rotate counterclockwise to unwind sheet 40 from feed spool 46.

A solenoid 114 is mounted upon support panel 54. The armature 116 of this solenoid is attached to portion 86d of plate 86 by hook 118. Upon activation of the solenoid 114, the armature 116 pulls pivot plate 86 downwardly against the bias of spring 96, bringing drive gear 102 into mesh with gear 110 of feed spool 46 and simultaneously taking idler gear 104 out of mesh with gear 108 of take-up spool 62. Therefore, upon activation of motor 90, drive gear 102 again rotates counterclockwise and gear 110 together with feed spool 46 rotate clockwise to wind back the portion of sheet 40 which has been unwound and rolled up on take-up spool 62.

Referring to FIGS. 2 and 5, a pad of fibrous material 120 is held by spring arm 122 in frictional contact with the outer surface of flange 48 of feed spool 46, the pad extending through an aperture in support panel 56. This provides a braking action upon feed spool 46 to maintain the sheet 40 under tension as it is unwound from feed spool 46 onto take-up spool 62, thus assisting to maintain flat the portion of the sheet being read through aperture 38. The flat bed plate 78 also is preferably made of white material to enhance the reflection of light from the exposed surface of sheet 40 during reading.

Figure 6:
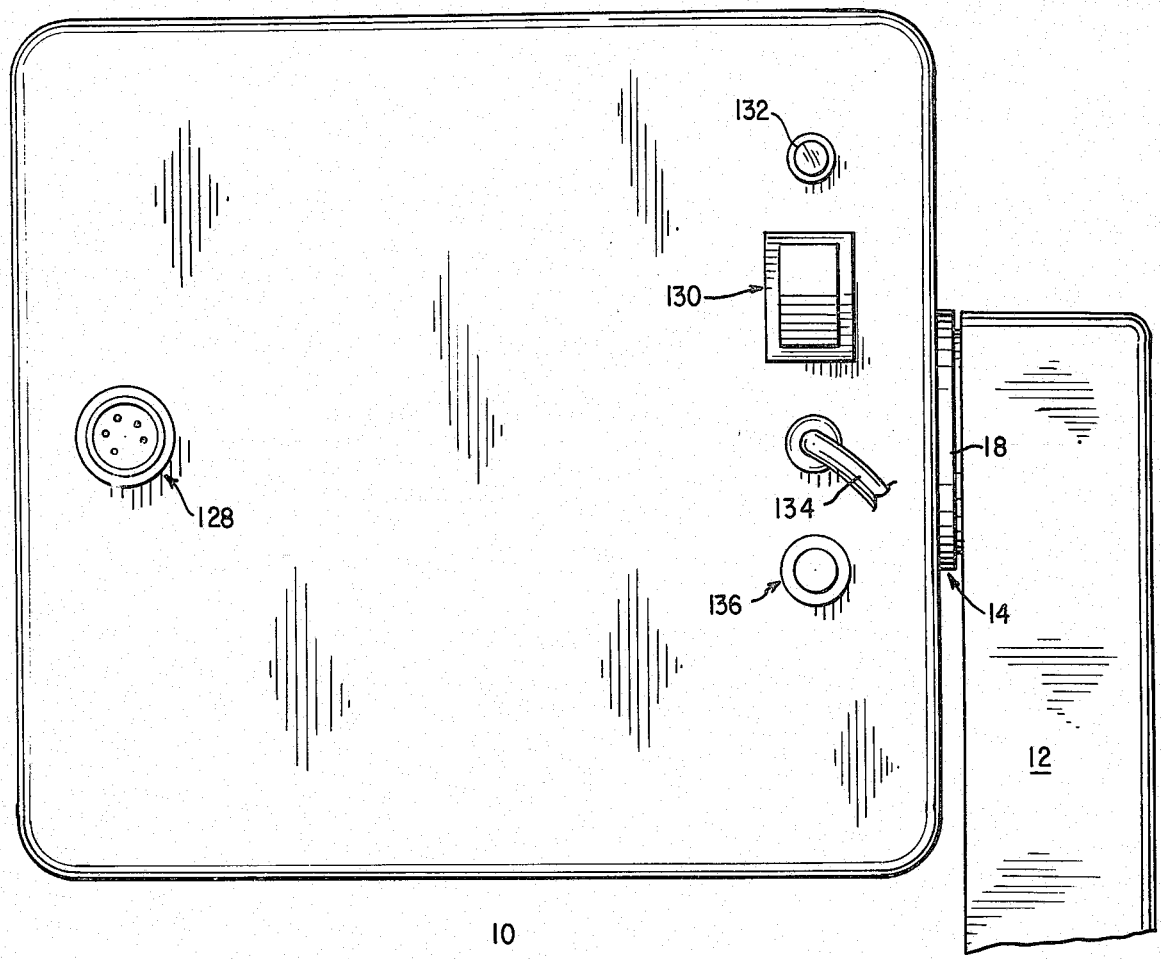
FIG. 6 is a rear view of the apparatus as shown in FIG. 1.

Referring now to FIG. 1, a remote control 124 is provided to control the operation of the reading apparatus. This control is connected through wire 126 which is plugged into a jack 128 in the back of enclosure 10 (see FIG. 6). Also shown on the back of enclosure 10 are an "on"—"off" rocker switch 130, a pilot light 132, a power line 134 which is connected through a main fuse 136 to a 115–120 volt 60 Hz source.

Control 124 has four spring-loaded push buttons 138, 140, 142 and 144. Button 138 is associated with an upwardly pointing triangle, button 140 with a downwardly pointing triangle, button 142 with a single horizontal line and button 144 with multiple horizontal lines.

Jack 128 connects the push button of control 124 to electronic control circuitry within enclosure 10 (not shown). This circuitry may be comprised of conventional logic control circuits which connect the power source to motor 90 through various operating modes under control of push buttons 138, 140, 142 and 144 and light detector 84. The operation of these control circuits is as follows.

Upon actuation of the switch 130 to the "on" position, the pilot light 132 and the light source 82 are energized. When button 138 is pushed, a control signal is generated which provides paths to motor 90 for further signals generated by buttons 142 and 144 and detector 84, without including any energizing path for solenoid 114. Therefore, when button 142 is pushed, a control signal is generated which actuates motor 90 to unwind sheet 40 from the feed spool 46 onto take-up spool 62 and when an index mark 42 interrupts the light from source 82, detector 84 generates a signal which deactuates motor 90. Thus, sheet 40 is unwound to the extent of a single page for display through aperture 38, and repeated operation of button 142 will, in like manner, unwind sheet 40 page-by-page for reading.

If after button 138 has been operated button 144 is operated instead of button 142, a signal is generated which actuates motor 90 and which simultaneously blocks the path for control signals from detector 84 to motor 90, with the result that sheet 40 is continuously unwound regardless of the interruption of light from source 82 by index marks 42. This continuous unwinding persists until button 144 is operated a second time, which generates a signal unblocking the path for control signals from detector 84 to motor 90, whereby the motor 90 is deactuated upon the next interruption of light from source 82 by an index mark 42. Thus, the user may continuously unwind sheet 40 and stop at any desired page.

Upon operation of push button 140 instead of button 138, a control signal is generated which closes a path from the power source to the solenoid 114, thereby energizing the solenoid and causing its armature 116 to pull pivot plate 86 downwardly to bring drive gear 102 into mesh with gear 110 of feed spool 46. Operation of button 140 also provides paths for control signals from buttons 142 and 144 and light detector 84 to motor 90. Therefore, subsequent operation of button 142 or 144 will result in the same page-by-page or continuous movement of sheet 40 as described above, but in a reverse direction, to wind back upon feed spool 46 the unwound portion of sheet 40 on take-up spool 62.

It will be evident that the foregoing control system provides the user with great flexibility of operation of the apparatus and also a safety feature which prevents accidental tearing of sheet 40 by inadvertent operation of button 138 or 140 when such operation is opposite to the continuous movement of the sheet. For example, if sheet 40 is being continuously unwound as a result of operation of buttons 138 and 144, as previously described above, inadvertent operation of button 140 will open the paths for control signals provided by button 138, thereby deactuating motor 90 and preventing feed spool 46 from being suddenly rotated in the opposite, wind-back direction, even though its gear 110 has now been meshed with drive gear 102. In fact, motor 90 will remain deactuated until further operation of button 142 or 144. The same safeguard will occur if buttons 140 and 144 have been operated to continuously windback sheet 40 onto feed spool 46 and button 138 is thereafter inadvertently operated. This safety feature is particularly useful when the apparatus is operated by handicapped persons using the controls described hereinbelow.

FIG. 7 illustrates an alternative remote control which may be substituted for control 124 and which is operable by persons whose handicap permits only gross movement of their limbs, such as a swipe of the arm. This alternative control comprises a rugged springloaded stick-type handle 146 mounted upon a base which is provided with heavy weights 150. The handle 146 operates a heavy duty four-position switch mounted within the base and connected by a wire 152 to jack 128, similar to wire 126 in FIG. 1. The handle 146 may be batted in any of the four directions indicated by the arrows on its top to generate the same control signals as previously described for push buttons 138, 140, 142 and 144 in FIG. 1. For example, the north and south handle positions may be selected to correspond with push buttons 138 and 140 and the east and west handle positions to correspond with push buttons 142 and 144.

Preferably movement of the handle 146 is restricted to the four indicated directions and the generation of control signals is effected when the handle reaches the limit of its travel in the four permitted directions in order to enable imperfectly directed gross motions of the user to be utilized for operation of the control.

Referring now to FIG. 8, another alternative control is shown adapted for use by handicapped persons, such as arthritics, who have restricted finger movement. The control comprises a body portion 154 from which keylike levers 156 extend for operation by the user's hand as shown in broken lines. The levers 156 operate switches which require only a slight movement, such as microswitches, and thereby generate control signals which are conducted by wire 158 to jack 128 to control the operation of the apparatus in the same manner as described for the control shown in FIG. 1. Any four of the five levers shown in FIG. 8 may be utilized to generate the control signals described for the push buttons 138, 140, 142 and 144 in FIG. 1. A fifth lever and its associated switch is included in FIG. 8 to increase the adaptability and utility of the control for persons who may have a variety of digital handicaps, including loss of the use of a particular finger.

Referring now to FIG. 9, another alternative control is there shown which is adapted for operation by handicapped persons who have lost all use of their extremities such as quadriplegics. This control comprises a base 160 into which two airpipes 162 and 164 are screw mounted. Each air pipe may be taken in the mouth and breathed into or out of by the user to generate two control signals, or a total of four signals which are conducted through wire 166 to jack 128 and which correspond to the control signals described for the push buttons 138, 140, 142 and 144 in FIG. 1. Further details of the construction and operation of the control of FIG. 9 are found in my co-pending application Ser. No. 356,411, filed on even date herewith, entitled "A Breath Operated Switch", the disclosure of which is incorporated herein by reference.

All of the above-described remote controls are best implemented by use of low voltages and currents, typically 5V D.C. and 10–20 ma, thereby minimizing the hazard of electric shock to the user.

Any departure from the foregoing specific description which conforms to the principles of the present invention is intended to be covered by the appended claims.

What I claim is:

1. An apparatus for presenting reading material in the form of a plurality of pages to be read by direct viewing under ambient light, comprising:
   a. a single sheet having all the pages of said material to be read printed thereon in a predetermined order;
   b. index marks disposed on said sheet for indicating the position of each of said pages;
   c. enclosure means for enclosing said single sheet, said enclosure means defining an aperture large enough for a portion of said sheet corresponding to at least one page of said reading material to be displayed for reading;

d. feed spool means for supporting said single sheet in roll form within said enclosure;

e. means for guiding said sheet along a path extending from said feed spool means, said path lying subadjacent said aperture;

f. take-up spool means for taking up said sheet from the guide means and unwinding said sheet from said support means by advancing said sheet along said path past said aperture whereby successive pages of said reading material are displayed through said aperture in said predetermined order;

g. motor means having a source of power;

h. transmission means having first and second modes for coupling said motor alternately to either said feed spool means or said take-up spool means, respectively, said transmission means comprising:
  I. a first gear mounted for rotation with said feed spool;
  II. a second gear mounted for rotation with said take-up spool;
  III. plate means pivotally mounted in said enclosure;
  IV. gear means mounted on said plate means for coupling power from said motor to either said first gear in said first mode when said plate is in a first position or said second gear in said second mode when said plate is in a second position;
  V. a spring for urging said plate into one of said positions; and
  VI. a solenoid for urging the plate into the other position in response to said control means;

i. remote switch means adapted to be actuated into a plurality of switch configurations by a handicapped person from a location which is remote from said enclosure means;

j. means for detecting said index marks; and k. control means responsive to said remote switch means and said means for detecting said index marks on each of said pages for controlling said motor means and said transmission means in response to said remote switch means to cause the selective unwinding and winding of said sheet and the successive display of each of said pages.

2. An apparatus for presenting reading material as in claim 1, further comprising a support for rotatably supporting said enclosure and means for stably maintaining said enclosure in any desired angular position.

3. Apparatus as in claim 1, wherein said remote switch means comprises:
  a. a spring-loaded switch;
  b. a base; and
  c. a stick-type handle mounted upon said base for actuation of said switch, said switch assuming one of a plurality of different switch configurations when said handle is deflected into one of a plurality of positions.

4. Apparatus as in claim 1, wherein said remote switch means comprises:
  a. a body portion;
  b. a plurality of key-like elements extending from said body portion;
  c. a plurality of switches mechanically coupled to said elements for actuation of said switches by said elements; and
  d. means for securing said elements to the handicapped person's hand for selective actuation of the switches.

5. Apparatus as in claim 1, wherein said remote switch means comprises a pair of breath operated switches, said switches being operated by a pair of tubes.

* * * * *